United States Patent
Gebauer et al.

(10) Patent No.: US 8,192,078 B2
(45) Date of Patent: Jun. 5, 2012

(54) DEVICE FOR RECORDING THE PRESSURE AND THE TEMPERATURE IN AN INTAKE MANIFOLD OF AN INTERNAL COMBUSTION ENGINE

(75) Inventors: Jan Gebauer, Karlsruhe (DE); Masoud Habibi, Schwieberdingen (DE); Markus Reinhard, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 435 days.

(21) Appl. No.: 12/492,581

(22) Filed: Jun. 26, 2009

(65) Prior Publication Data

US 2009/0323760 A1 Dec. 31, 2009

(30) Foreign Application Priority Data

Jun. 26, 2008 (DE) .......................... 10 2008 002 682

(51) Int. Cl.
*G01K 1/14* (2006.01)
*G01K 13/00* (2006.01)
(52) U.S. Cl. .................... 374/144; 374/143; 374/208
(58) Field of Classification Search ................. 374/143, 374/144, 208
See application file for complete search history.

(56) References Cited

U.S. PATENT DOCUMENTS

| 6,212,946 B1 * | 4/2001 | Naegele et al. ............ 73/114.31 |
| 6,272,913 B1 * | 8/2001 | Naegele et al. ............ 73/114.31 |
| 7,000,478 B1 * | 2/2006 | Zwollo et al. .................. 73/708 |
| 7,216,546 B2 * | 5/2007 | Hayashi et al. ................. 73/708 |
| 7,690,262 B2 * | 4/2010 | Nakabayashi .................. 73/708 |

FOREIGN PATENT DOCUMENTS

DE 197 31 420 1/1999

OTHER PUBLICATIONS

Definition of SMD (http://en.wikipedia.org/wiki/Surface-mount_technology).*

* cited by examiner

*Primary Examiner* — Lisa Caputo
*Assistant Examiner* — Mirellys Jagan
(74) *Attorney, Agent, or Firm* — Kenyon & Kenyon LLP

(57) ABSTRACT

A device for recording the pressure and the temperature in an intake manifold of an internal combustion engine, a pressure sensor and a temperature sensor being situated in a common housing, and an evaluation of a signal of the temperature sensor being provided outside the housing. An EMC protective circuit is provided in this context, which is integrated into the housing and/or is situated on the housing, and is electrically connected to the temperature sensor.

9 Claims, 3 Drawing Sheets

DEVICE FOR RECORDING THE PRESSURE AND THE TEMPERATURE IN AN INTAKE MANIFOLD OF AN INTERNAL COMBUSTION ENGINE

FIELD OF THE INVENTION

The present invention relates to a device for recording the pressure and the temperature in an intake manifold of an internal combustion engine, a pressure sensor and a temperature sensor being situated in a common housing, and the evaluation of a signal of the temperature sensor being provided to take place outside the housing.

BACKGROUND INFORMATION

Devices are described, for instance, in German Patent No. DE 197 31 420. It describes such a device, in which a temperature sensor and a pressure sensor that is fastened, to the greatest extent in a stress-free manner, on a carrier together with an evaluation circuit, are situated in a common housing. The device described is distinguished by the fact that a very precise pressure measurement is made possible, while its production is very simple. This is achieved by having the housing include at least two chambers that are separate from each other. One of these chambers is connected to the intake manifold via a connecting piece and is sealed from the environment, so that a pressure chamber is developed in which the pressure sensor is situated.

In such devices, in order to record the pressure and the temperature, one normally makes a temperature measurement via a passive component that forms the temperature sensor, that is, for example, a negative temperature coefficient resistor or NTC resistor. The passive component is connected via a wiring harness directly to an evaluation circuit, which may be provided in a control unit. The evaluation of the signal of the temperature sensor is not carried out in the common housing. Because of this wiring configuration, noise suppression is the task of the evaluation circuit.

If an increased electromagnetic load occurs with respect to irradiation onto the connection between temperature sensor and evaluation circuit, that is, the wiring harness, or onto the sensor, this may have the effect of influencing the signal of the temperature sensor. This cannot be detected by the evaluation circuit, so that the signal is regarded as a valid signal of the temperature sensor, in spite of the error that is present. It follows that additional variables, based on the signal of the temperature sensor, or rather the temperature, are influenced negatively.

SUMMARY OF THE INVENTION

The device according to the present invention for recording the pressure and the temperature in an intake manifold of an internal combustion engine has the advantage that the temperature sensor is integrated into the device in an interference-proof manner. An EMC (electromagnetic compatibility) protective circuit is provided which is integrated into the housing and/or is situated on the housing and is electrically connected to the temperature sensor. The device according to the present invention may advantageously be used in an intake manifold of an internal combustion engine. The air supply to the internal combustion engine is ensured via the intake manifold. This means that the device is able to determine pressure and temperature on the fresh-air side of the internal combustion engine. The device may be provided at any desired position on the intake manifold, in this context.

The pressure and the temperature may be recorded directly before the inlet into the internal combustion engine and/or directly after a supercharger that is connected to the intake manifold of the internal combustion engine. In fact, the device according to the present invention may be used at any location where a combined recording of pressure and temperature is of advantage. It is provided, according to the present invention, that the evaluation of the signal of the temperature sensor shall be carried out outside the housing. This means that the temperature sensor does not provide its own evaluation circuit in the common housing. It is rather provided that the signal of the temperature sensor be guided out of the common housing, and that the evaluation of the signal only takes place there. In order to minimize, and as much as possible completely prevent interference in the signal, on the way from the temperature sensor to an evaluation circuit, an EMC protective circuit is provided. The latter is integrated into the housing, and thus is located within the common housing and/or is situated on the housing. This means that the EMC protective circuit may also be situated outside the housing, and may be connected to the outer surface of the housing. In order to ensure interference suppression, the EMC protective circuit is electrically connected to the temperature sensor. The EMC protective circuit provided according to the present invention is thus independent of an external wiring configuration of the temperature sensor, and may simply be integrated into designs that are already present.

One refinement of the present invention provides that the EMC protective circuit be formed of an interference-suppression capacitor. An interference-suppression capacitor represents a simple but extremely effective possibility of ensuring interference suppression of the temperature sensor's signal. It is cost-effective, for one thing, and it is simple to integrate into already present designs, for another thing.

One refinement of the present invention provides that the EMC protective circuit be connected directly to the at least one electric terminal of the temperature sensor. This means that, between the at least one electric terminal of the temperature sensor and the EMC protective circuit no further components are provided, apart from electrical conductors and contacts. It is advantageous, in this context, to position the EMC protective circuit in the vicinity of the temperature sensor, and to keep the signal paths between the temperature sensor and the EMC protective circuit to as short as possible. Doing it this way, the interference suppression of the temperature sensor takes place in such a way that extreme effects are hardly, or not at all, able to influence the signal of the temperature sensor. If the temperature sensor is provided in the form of a temperature-dependent resistor and the EMC protective circuit is provided in the form of an interference-suppression capacitor, it is advantageous in each case to connect the two terminals of the temperature sensor and the EMC protective circuit to each other, that is, to connect the EMC protective circuit in parallel to the temperature sensor.

Another refinement of the present invention provides that the EMC protective circuit be set onto the housing and/or be fastened to the housing inside or outside. This means that the EMC protective circuit is able to be fastened to the housing via suitable fastening means, but that it is also possible just to set the EMC protective circuit onto the housing without first providing fastening, that is, a direct connection between the EMC protective circuit and the common housing. It may be provided, for example, to hold the EMC protective circuit to the housing by form locking or frictional engagement. The fastening may be provided using an adhesive or melting it on, for example.

Still another refinement of the present invention provides that the EMC protective circuit be furnished with a cover, especially one made of a molding compound, and particularly encapsulated. The EMC protective circuit is able to be protected from outside influences by the cover. However, it may also be provided that fastening the EMC protective circuit using the cover be provided. This may particularly be provided if the EMC protective circuit is merely set onto the housing. In that case, the cover takes care both of the fastening and the protection from outside influences. It may be provided that the cover covers the EMC protective circuit only on one side. This may be the case, for instance, if the cover takes care of the fastening to the housing. However, it is also possible to encapsulate the EMC protective circuit, so that the EMC protective circuit is completely enclosed by the cover. An adhesive or, alternatively, an epoxy resin may be provided as the molding compound.

One refinement of the present invention provides that the interference-suppression capacitor be an SMD interference-suppression capacitor. An SMD interference-suppression capacitor has no wiring connections, but is mounted directly onto a surface, using terminal pads. This makes possible substantially smaller designs than by using normal capacitors. SMD interference-suppression capacitors may either be soldered on or adhered on.

Still another refinement of the present invention provides that the temperature sensor be electrically connected to the pressure sensor via the EMC protective circuit. This means that at least one electrical terminal of the temperature sensor is connected to at least one electrical terminal of the pressure sensor via the EMC protective circuit. It may be provided, for instance, to connect a ground connection of the temperature sensor to a terminal of the pressure sensor, which represents a positive pole, via the EMC protective circuit. In this way, similarly to the direct connection of the EMC protective circuit to the temperature sensor, interference with the signal of the temperature sensor is able to be prevented. In particular, in this way, sudden voltage drops or increases are filtered out of the signal. In this context, care should be taken that the signal of the temperature sensor via the EMC protective circuit is not able to exert an influence on a signal of the pressure sensor, or vice versa.

One further development of the present invention provides that a signal of the temperature sensor and/or a signal of the pressure sensor is/are guided out of the housing via flat plug contacts. In this way, the device may be executed as being simply exchangeable or connectable. Flat plug contacts represent electrical connections which have an essentially rectangular cross section. A secure connection may be produced via flat plug connectors, of the device for recording the pressure and the temperature, to a terminal element, for instance, a socket or a coupling.

Another further development of the present invention provides connecting lines which produce an electrical connection between the temperature sensor and/or the pressure sensor and the flat plug contacts, the EMC protective circuit being mounted, particularly adhered onto the connecting lines, so that there exists an electrical connection of adjacent connecting lines via the EMC protective circuit. The connecting lines may be developed as so-called lead frames, that is, circuit traces having a certain mechanical stability, in this instance. Alternatively, printed-circuit traces on a carrier material may also be provided. The carrier material is not necessary if lead frames are used, since these are sufficiently rigid to produce a secure connection between temperature sensor and/or pressure sensor and the flat plug contacts. One may, however, also imagine a connection between temperature sensor and/or pressure sensor and the flat plug contacts via stranded wire and/or cable connections. The EMC protective circuit is mounted on the connecting lines in such a way that there is an electrical connection of adjacent connecting lines. The connecting lines do not have to be directly adjacent, and it may be provided, for instance, that connecting lines are connected to one another between which there is an additional connecting line. If the connecting lines are developed as lead frames, it is preferred that an adhesion connection between connecting lines and lead frames be produced. This takes place preferably if the EMC protective circuit is developed as an SMD interference-suppression capacitor. As an alternative type of fastening, the EMC protective circuit may also be soldered on, particularly onto the lead frames.

Still another refinement of the present invention provides that at least one additional EMC protective circuit or the same EMC protective circuit be assigned to the pressure sensor. That is, it is provided that the signal of the pressure sensor also has interference suppressed. For this purpose, at least one further EMC protective circuit may be provided, for instance by applying additional interference-suppression capacitors, especially SMD interference-suppression capacitors onto the connecting lines, particularly the lead frames. However, it may also be provided that the signal of the pressure sensor has interference suppressed for it via the same EMC protective circuit that is used for suppressing interference for the signals of the temperature sensor.

The EMC protective circuit may advantageously be executed in such a way that the signal of the temperature sensor is processed inside the common housing, and is passed on only for evaluation outside the housing if the signal of the temperature sensor is valid. This specific embodiment thus represents an active EMC protective circuit. It may also be provided that an evaluation of the signal of the pressure sensor already takes place in the common housing.

The pressure sensor may be designed both as a TMAP sensor and as an LDF sensor.

DETAILED DESCRIPTION

Figure 1:
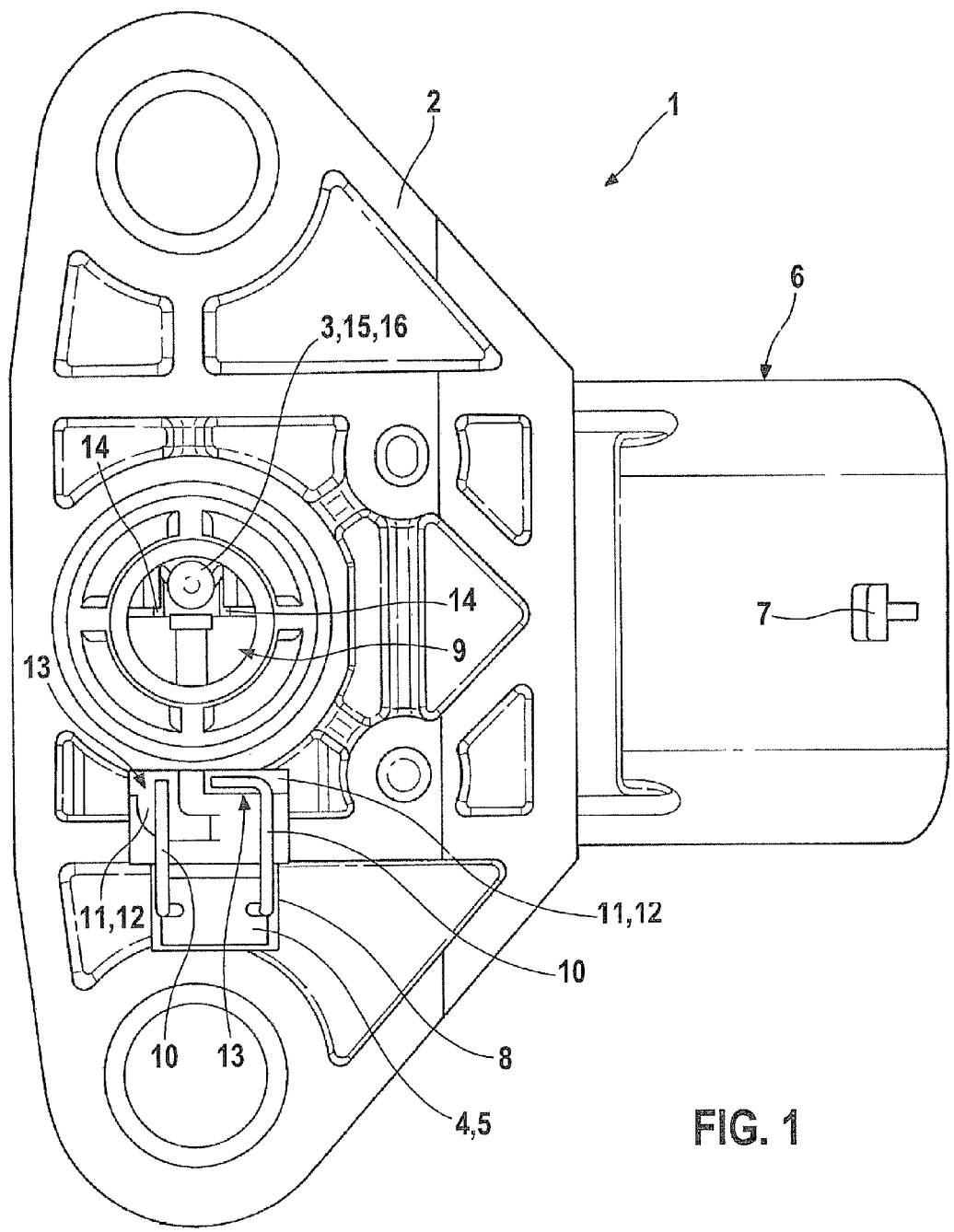
FIG. 1 shows a housing of a device for recording the pressure and the temperature using a pressure sensor and an EMC protective circuit, in a view from the outside, from below, in a first circuit variant.

FIG. 1 shows a device 1 for recording the pressure and the temperature in an intake manifold (not shown) of an internal combustion engine (also not shown). Device 1 has a housing 2 which includes a pressure sensor (not shown), a temperature sensor 3 and an EMC protective circuit 4, that is formed in this case by an interference-suppression capacitor 5. Device 1 is able to be connected to a socket or a coupling (not shown) via a plugging device 6. At least one latching projection 7 takes care of a secure connection between plugging device 6 and the socket or coupling, in this instance. Interference-suppression capacitor 5 is provided in a recess 8 of housing 1, in a first embodiment variant, and is held in it by suitable means. A latching connection or a clamping connection may be provided, for example. Alternatively, interference-suppression capacitor 5 may also be provided with a cover. The latter may be made of a molding compound, using which recess 8 is filled up. Interference-suppression capacitor 5 is held securely in recess 8 by the molding compound. It is also protected from outside influences by the cover or the molding compound. Housing 2 has openings 9, via which temperature sensor 3 may come into fluid contact with an environment. In particular, a media flow through opening 9 is present. Interference-suppression capacitor 5 has electrical terminals 10, via which it is connected to connecting lines 11, which are developed as lead frames, in this instance. This connection is preferably produced by soldering. It is advantageous if recess 8 also encloses electrical terminals 10 of interference-suppression capacitor 5 and their points of contact 13 to lead frames 12. By filling up the recess with molding compound, electrical terminal 10 and point of contact 13 may thus also be protected. Alternatively, it is also possible for electrical terminals 10 and point of contact 13 to be enclosed by the cover, without their being in the area of recess 8. Temperature sensor 3 is also connected to lead frames 12 via electrical terminals 14. This is not recognizable in FIG. 1. For instance, temperature sensor 3 may be formed by a passive component 15, particularly a negative temperature coefficient resistor 16.

Figure 2:
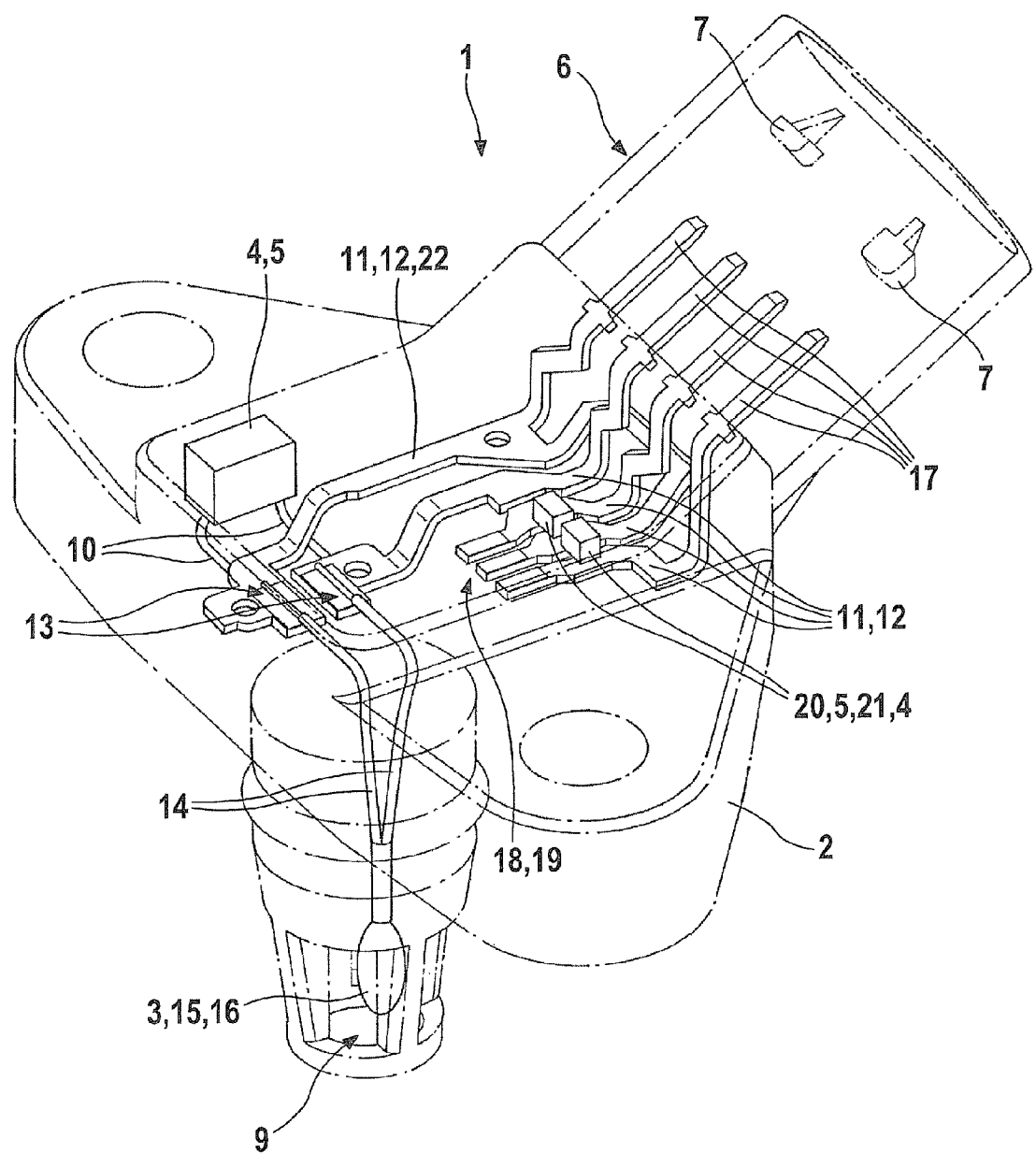
FIG. 2 shows a perspective representation of the temperature sensor and the EMC protective circuit in a first circuit variant.

FIG. 2 shows a dashed line representation of housing 2 of device 1, as well as a perspective representation of temperature sensor 3, interference-suppression capacitor 5 and lead frames 12. In this representation, flat plug contacts 17 may be seen which are situated in plugging device 6, and via which the electrical connection may be produced to the socket or coupling. It may be seen that connecting lines 11 or lead frames 12 have an electrical connection to flat plug contacts 17, or rather, they form these. This means that flat plug contacts 17 are a part of lead frames 12. Two of flat plug contacts 17 or lead frames 12 are in electrical contact with interference-suppression capacitor 5 and temperature sensor 3 at a point of contact 13. In this context, a connection of temperature sensor 3 using connecting lines 14 is provided on a top side of the lead frames, whereas interference-suppression capacitor 5 is connected at the bottom side of lead frames 12 using connecting lines 10. Connecting temperature sensor 3 and interference-suppression capacitor 5 to lead frames 12, at points of contact 13, preferably takes place by soldering. It is also visible that three additional lead frames 12 form a point of contact 18 the pressure sensor, that is not shown. This point of contact 18 is developed as a plug connector location 19. This means that the pressure sensor is able to come into electrical contact with the plug connector location via a plug connection. The three lead frames 12 which are connected to plug connector location 19 have two additional EMC protective circuits 20. Using these additional EMC protective circuits 20, interferences may also be filtered out of a signal of the pressure sensor. The additional EMC protective circuits 20 are also developed as interference-suppression capacitor 5, but have a special design (SMD interference-suppression capacitors 21). SMD interference-suppression capacitors 21 each produce an electrical connection of adjacent lead frames 12. SMD interference-suppression capacitors 21 are preferably adhered to lead frames 12. It may also be seen in FIG. 2 that one lead frame 12, connecting lead frames 22, which is in contact with temperature sensor 3, is also electrically connected to plug connector location 19 for the pressure sensor. In this way, for example, a common current supply or a common ground connection is able to be produced.

Figure 3:
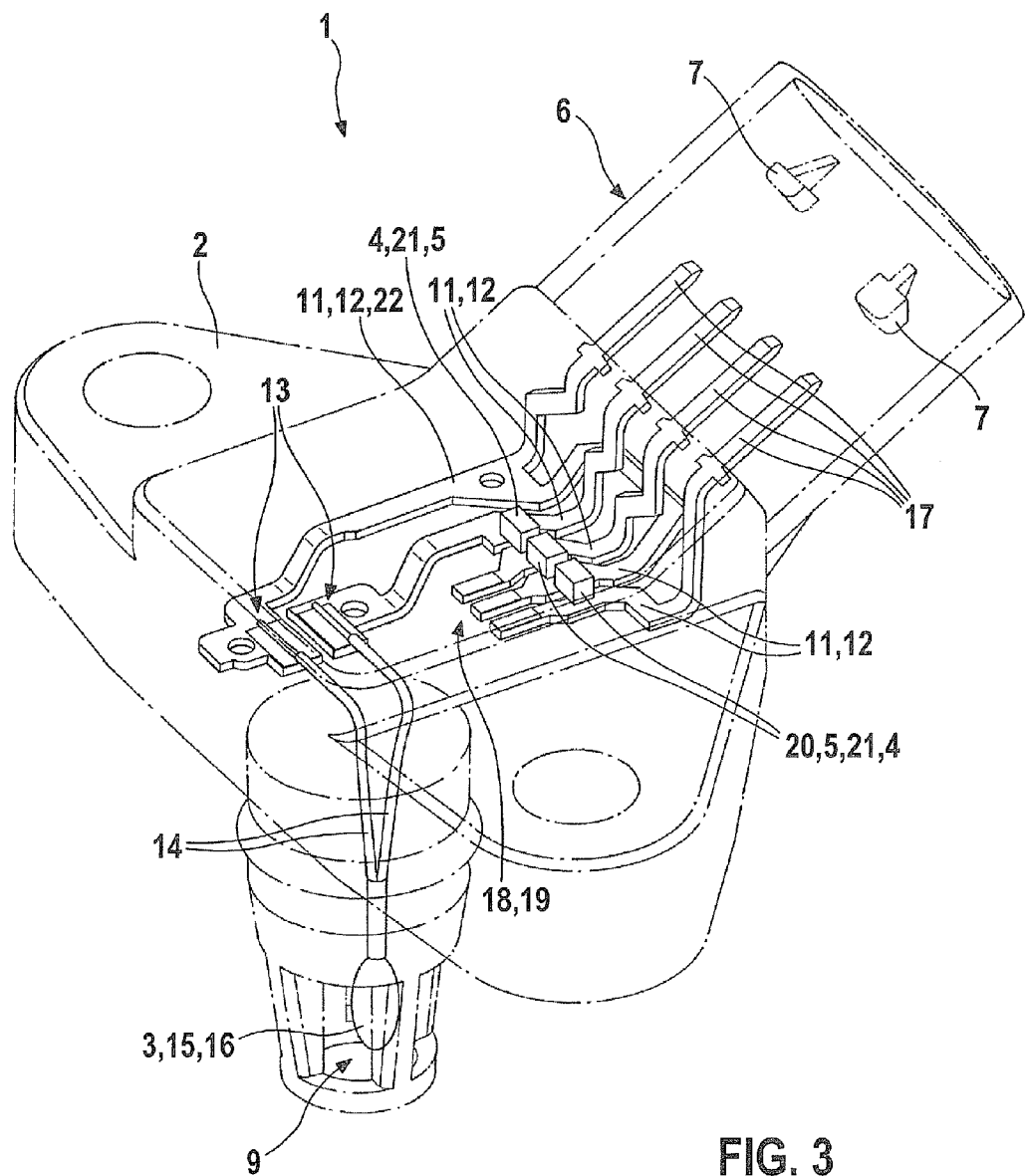
FIG. 3 shows a perspective representation of the temperature sensor and the EMC protective circuit in a second circuit variant.

FIG. 3 shows an additional variant on which one may perform an interference suppression of the signal of the temperature sensor. In this case, EMC protective circuit 4 is also provided as an SMD interference-suppression capacitor 21. Via the latter, an electrical connection between two adjacent lead frames 12 is produced, one of lead frames 12 being assigned to temperature sensor 3, while the second lead frame is able to be connected to the pressure sensor via plug connector location 19. This means that an interference suppression of temperature sensor 3 is able to be implemented via the application of an additional SMD interference-suppression capacitor 21. As described before, SMD interference-suppression capacitors 21 are provided for interference suppression of the signal of the pressure sensor, which means that an additional SMD interference-suppression capacitor 21, for the interference-suppression of the signal of the temperature sensor, causes only a slight additional production expenditure for device 1.

What is claimed is:

1. A device for recording a pressure and a temperature in an intake manifold of an internal combustion engine, comprising:
    a common housing;
    a pressure sensor situated in the common housing;
    a temperature sensor situated in the common housing, an evaluation of a signal of the temperature sensor being provided outside the housing; and
    an EMC protective circuit at least one of (a) integrated into the housing and (b) situated on the housing, the EMC protective circuit being electrically connected to the temperature sensor;
    wherein the EMC protective circuit is directly connected to at least one electric terminal of the temperature sensor.

2. The device according to claim 1, wherein the EMC protective circuit is set onto the housing or is fastened to the housing inside or outside.

3. The device according to claim 1, wherein the EMC protective circuit includes a cover, made of a molding compound, and is encapsulated.

4. The device according to claim 1, wherein the temperature sensor is electrically connected to the pressure sensor via the EMC protective circuit.

5. The device according to claim 1, wherein at least one additional EMC protective circuit or the EMC protective circuit is assigned to the pressure sensor.

6. The device according to claim 1, wherein the EMC protective circuit includes an interference-suppression capacitor.

7. The device according to claim 6, wherein the interference-suppression capacitor is an SMD interference-suppression capacitor.

8. The device according to claim 1, wherein at least one of (a) the signal of the temperature sensor and (b) a signal of the pressure sensor is guided out of the housing via flat plug contacts.

9. The device according to claim 8, further comprising connecting lines which produce an electrical connection between the temperature sensor or the pressure sensor and the flat plug contacts, the EMC protective circuit being mounted onto the connecting lines, being adhered onto them, so that an electrical connection of adjacent connecting lines exists via the EMC protective circuit.

* * * * *